United States Patent
Freed et al.

(10) Patent No.: US 12,417,759 B2
(45) Date of Patent: Sep. 16, 2025

(54) SPEECH RECOGNITION USING CADENCE PATTERNS

(71) Applicant: INTERNATIONAL BUSINESS MACHINES CORPORATION, Armonk, NY (US)

(72) Inventors: Andrew R. Freed, Cary, NC (US); Robert Michael Hervey, Apex, NC (US); Sorabh Murgai, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 311 days.

(21) Appl. No.: 17/813,944

(22) Filed: Jul. 21, 2022

(65) Prior Publication Data

US 2024/0029712 A1 Jan. 25, 2024

(51) Int. Cl.
*G10L 15/02* (2006.01)
*G10L 15/26* (2006.01)

(52) U.S. Cl.
CPC .............. *G10L 15/02* (2013.01); *G10L 15/26* (2013.01)

(58) Field of Classification Search
CPC ................................ G10L 15/02; G10L 15/26
See application file for complete search history.

(56) References Cited

U.S. PATENT DOCUMENTS

| | | | |
|---|---|---|---|
| 7,143,037 B1 * | 11/2006 | Chestnut | G10L 15/22 704/E15.04 |
| 7,542,909 B2 * | 6/2009 | Cote | H04M 11/10 704/277 |
| 8,332,212 B2 | 12/2012 | Wittenstein | |
| 9,311,932 B2 | 4/2016 | Carter | |
| 9,666,208 B1 * | 5/2017 | Rubin | G10L 21/12 |
| 10,192,553 B1 * | 1/2019 | Chenier | H04L 65/80 |
| 10,242,669 B1 * | 3/2019 | Sandler | G10L 15/22 |
| 10,395,643 B2 * | 8/2019 | Velasco | G10L 17/06 |
| 10,440,325 B1 * | 10/2019 | Boxwell | H04N 5/445 |
| 11,100,925 B2 | 8/2021 | Chen | |
| 11,295,722 B2 | 4/2022 | Edwards | |
| 11,349,679 B1 * | 5/2022 | Laird-Mcconnell | G06Q 10/1095 |
| 11,417,337 B1 * | 8/2022 | Shi | G10L 15/22 |
| 2002/0143533 A1 * | 10/2002 | Lucas | G06F 40/174 704/235 |
| 2008/0053293 A1 * | 3/2008 | Georges | G10H 1/365 84/609 |
| 2009/0248415 A1 * | 10/2009 | Jablokov | G10L 15/30 704/251 |

(Continued)

OTHER PUBLICATIONS

Authors et al., "Utilizing Inter-Document Redundancy to Create Training Instances for Unsupervised Training of an Automatic Speech Recognizer", IPCOM000179840D, Feb. 27, 2009, pp. 1-4.

(Continued)

*Primary Examiner* — Andrew C Flanders
*Assistant Examiner* — Theodore Withey
(74) *Attorney, Agent, or Firm* — Edward J. Wixted, III (57) ABSTRACT

A method for speech recognition using cadence patterns is provided. The method includes identifying speech cadence in user speech, which includes a plurality of sounds and pauses. At least one speech cadence pattern is identified from the plurality of sounds and pauses. The user speech is transcribed, and the transcribed user speech is modified based on the identified speech cadence pattern.

19 Claims, 8 Drawing Sheets

(56) References Cited

U.S. PATENT DOCUMENTS

| | | | |
|---|---|---|---|
| 2015/0205779 A1* | 7/2015 | Bak | G10L 15/01 |
| | | | 704/235 |
| 2016/0225368 A1 | 8/2016 | Velasco | |
| 2017/0221475 A1* | 8/2017 | Bruguier | G10L 15/065 |
| 2019/0362022 A1* | 11/2019 | Haukioja | G10L 15/04 |
| 2020/0126561 A1* | 4/2020 | Kofman | G11B 27/031 |
| 2020/0184962 A1 | 6/2020 | Chen | |
| 2020/0294483 A1 | 9/2020 | Edwards | |
| 2021/0050004 A1* | 2/2021 | Whiting | G10L 15/02 |
| 2021/0224319 A1* | 7/2021 | Ingel | G06F 16/686 |
| 2022/0139418 A1* | 5/2022 | Aida | H04M 3/4283 |
| | | | 704/233 |
| 2023/0298615 A1* | 9/2023 | Can | G10L 15/1815 |

OTHER PUBLICATIONS

Disclosed Anonymously, "Advanced Feedback for Custom Language Models in Speech Recognition", IPCOM000256222D, Nov. 14, 2018, pp. 1-3.

Disclosed Anonymously, "Optimized System and Method for Gathering Training Data for Speech Custom Language Models", IPCOM000268462D, Jan. 31, 2022, pp. 1-4.

Https://notes.services.box.com/p/note?fileId=810650485023, "Speech Recognition Using Candence Patterns", Sep. 17, 2021, pp. 1-2.

Kambel, "Speech Recognition Using Artificial Neural Network—A Review", Int'l Journal of Computing, Communications & Instrumentation Engg. (IJCCIE) vol. 3, Issue 1 (2016) ISSN 2349-1469 EISSN 2349-1477, http://dx.doi.org/10.15242/IJCCIE.U0116002, pp. 1-4.

Mansour et al.; "Voice Recognition Using Dynamic Time Warping & Mel-Frequency Cepstral Coefficients Algorithms", vol. 116—No. 2, Apr. 2015, International Journal of Computer Applications (0975-8887), 8 pages.

Mell et al., "The NIST Definition of Cloud Computing", National Institute of Standards and Technology, Special Publication 800-145, Sep. 2011, pp. 1-7.

Meltzner et al., "Speech Recognition for Vocalized and Subvocal Modes of Production using Surface EMG Signals from the Neck and Face", Copyright 2008 ISCA, pp. 1-4.

* cited by examiner

- Audio example: saying "H as in hotel, E as in elephant" looks like this

Audio example: actually saying "eight ashen hotel" looks like this

SPEECH RECOGNITION USING CADENCE PATTERNS

BACKGROUND

Exemplary embodiments of the present inventive concept relate to speech recognition, and more particularly, to speech recognition using cadence patterns.

Speech-to-text software relies on detected words and expected character patterns to provide accurate transcriptions. However, speech to text software struggles to detect "sing-song" speech and words spoken with human-to-human cadence. In addition, speech-to-text software cannot detect implied information. This is because attributes of speech, such as cadence are discarded or ignored by speech-to-text software despite containing valuable clues regarding context. For example, when a user communicates a telephone number to speech-to-text software, the speech-to-text software will recognize only the literal 10-digit number string, and thus omit implied hyphens and parentheticals around the area code because the periodic pauses are neglected.

SUMMARY

Exemplary embodiments of the present inventive concept relate to a method, a computer program product, and a system for speech recognition using cadence patterns.

According to an exemplary embodiment of the present inventive concept, a method for speech recognition using cadence patterns is provided. The method includes identifying speech cadence in user speech, which includes a plurality of sounds and pauses. At least one speech cadence pattern is identified from the plurality of sounds and pauses. The user speech is transcribed, and the transcribed user speech is modified based on the identified speech cadence pattern.

According to an exemplary embodiment of the present inventive concept, a computer program product is provided for speech recognition using cadence patterns. The computer program product includes one or more non-transitory computer-readable storage media and program instructions stored on the one or more non-transitory computer-readable storage media capable of performing a method. The method includes identifying speech cadence in user speech, which includes a plurality of sounds and pauses. At least one speech cadence pattern is identified from the plurality of sounds and pauses. The user speech is transcribed, and the transcribed user speech is modified based on the identified speech cadence pattern.

According to an exemplary embodiment of the present inventive concept, a computer system is used for speech recognition using cadence patterns. The system includes one or more computer processors, one or more computer-readable storage media, and program instructions stored on the one or more of the computer-readable storage media for execution by at least one of the one or more processors capable of performing a method. The method includes identifying speech cadence in user speech, which includes a plurality of sounds and pauses. At least one speech cadence pattern is identified from the plurality of sounds and pauses. The user speech is transcribed, and the transcribed user speech is modified based on the identified speech cadence pattern.

BRIEF DESCRIPTION OF THE DRAWINGS

The following detailed description, given by way of example and not intended to limit the exemplary embodiments solely thereto, will best be appreciated in conjunction with the accompanying drawings, in which.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION OF THE DRAWINGS

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As aforementioned, speech-to-text software relies on detected words and expected character patterns to accurately transcribe speech. However, speech cadence information replete with contextual and accuracy indicators is being discarded or ignored by conventional speech-to-text software. The present inventive concept augments speech-to-text software by using context indicators exhibited in speech cadence to detect implied characters and improve word detection, thereby improving transcription accuracy. The present invention is valuable to stenographers, voice-enabled chat bots, work related dictation, dictated message composition, or any other speech to text solutions. Even when transcription mistakes occur, the present inventive concept is still more approximately accurate because it recognizes the context indicators exhibited in speech cadence.

Figure 1:
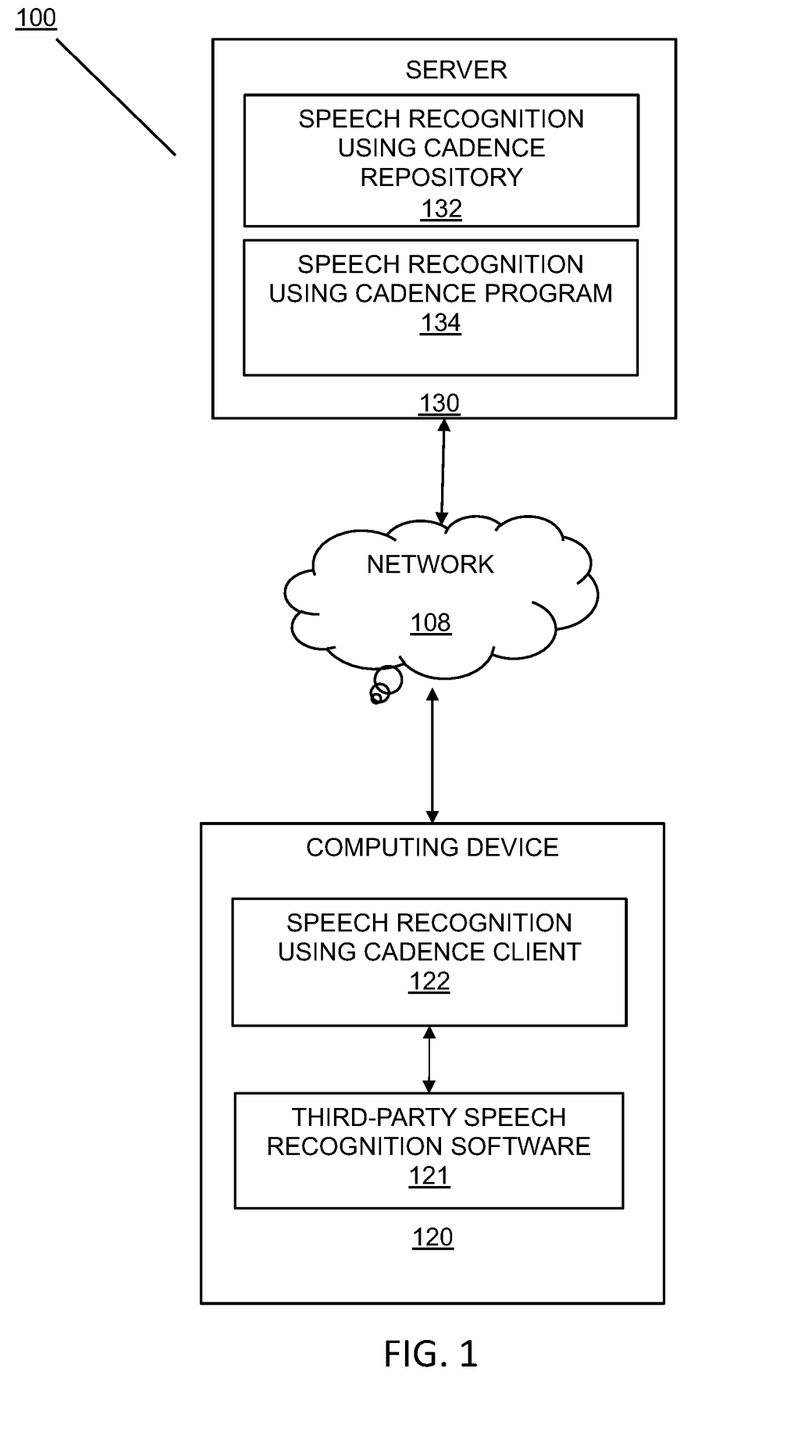
FIG. 1 illustrates a schematic diagram of a speech recognition using cadence patterns system 100, in accordance with an exemplary embodiment of the present inventive concept.

FIG. 1 depicts a speech recognition using cadence patterns system 100, in accordance with an exemplary embodiment of the present inventive concept.

The speech recognition using cadence system 100 may include a computing device 120 and a speech recognition using cadence server 130, which may all be interconnected via a network 108. Programming and data content may be stored and accessed remotely across several servers via the network 108. Alternatively, programming and data may be stored locally on as few as one physical computing device 120 or stored amongst multiple computing devices.

According to the exemplary embodiment of the present inventive concept depicted in FIG. 1, the network 108 may be a communication channel capable of transferring data between connected devices. The network 108 may be the Internet, representing a worldwide collection of networks 108 and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. The network 108 may be a Bluetooth network, a Wi-Fi network, or a combination thereof. The network 108 may operate in frequencies including 2.4 GHz and 5 GHz internet, near-field communication, Z-Wave, Zigbee, etc. The network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

The computing device 120 may include third-party speech recognition software 121, a speech recognition using cadence client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. The computing device 120 may be equipped with a microphone, a camera, and/or movement sensors. The computing device 120 may be a speech recognition equipped smart device. Although the computing device 120 is shown as a single device, the computing device 120 may be comprised of a cluster or plurality of computing devices, in a modular manner, etc., working together or working independently.

Figure 3:
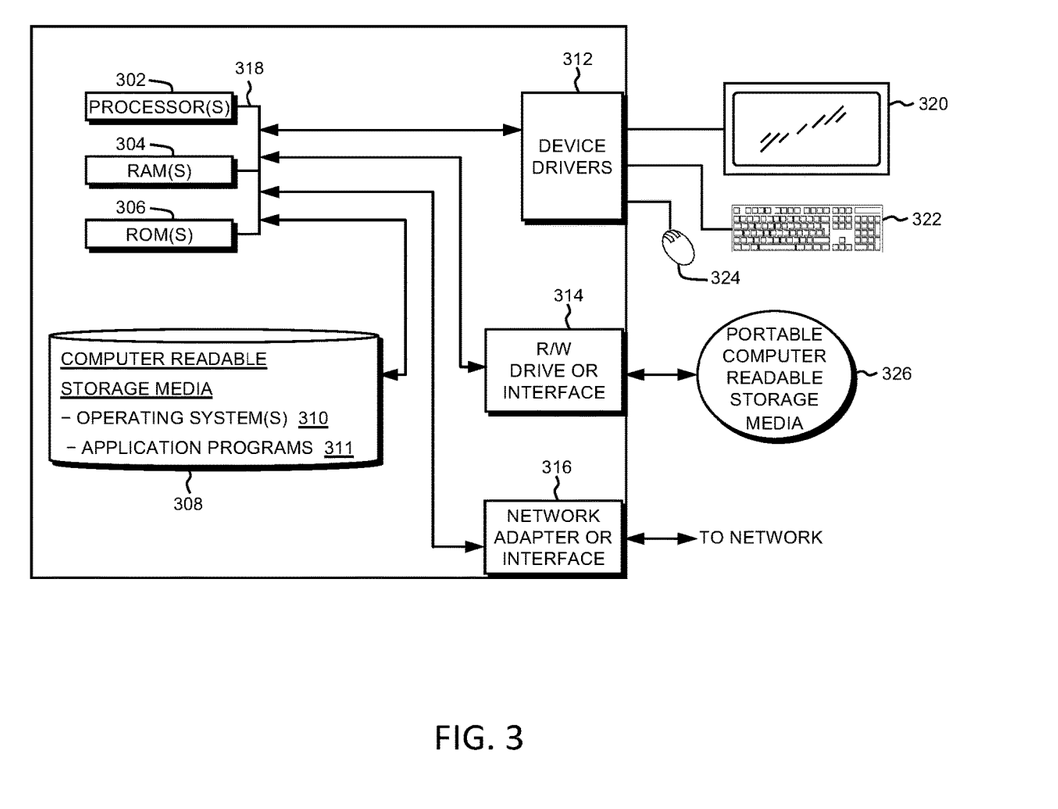
FIG. 3 illustrates a block diagram depicting the hardware components included in the speech recognition using cadence patterns system 100 of FIG. 1, in accordance with an exemplary embodiment of the present inventive concept.
Figure 4:
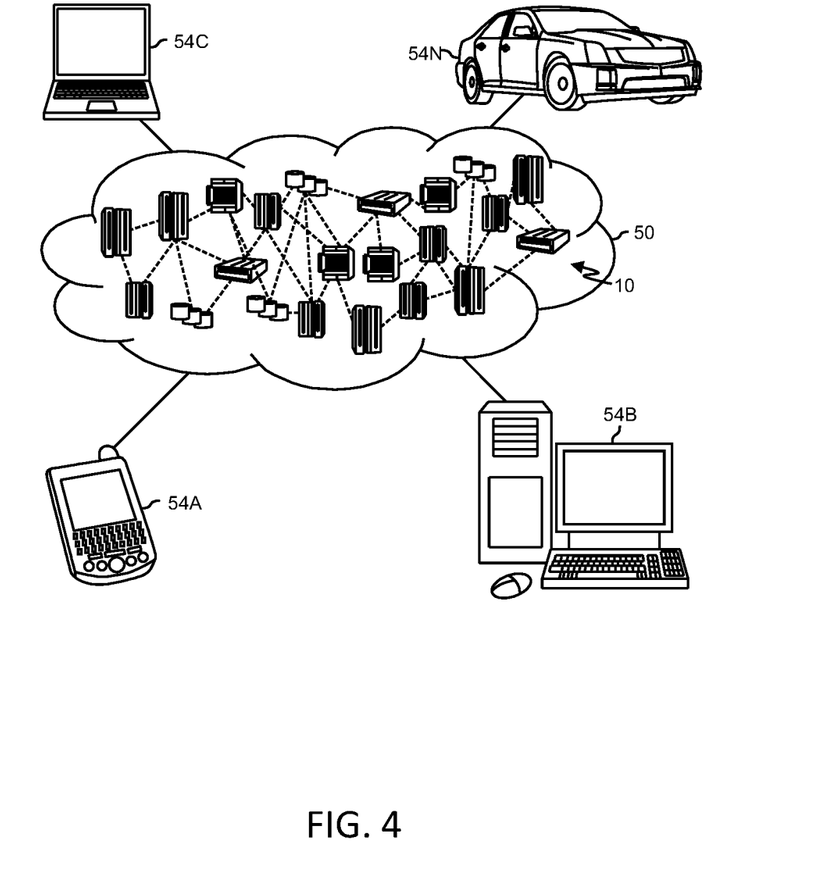
FIG. 4 illustrates a cloud computing environment, in accordance with an exemplary embodiment of the present inventive concept.
Figure 5:
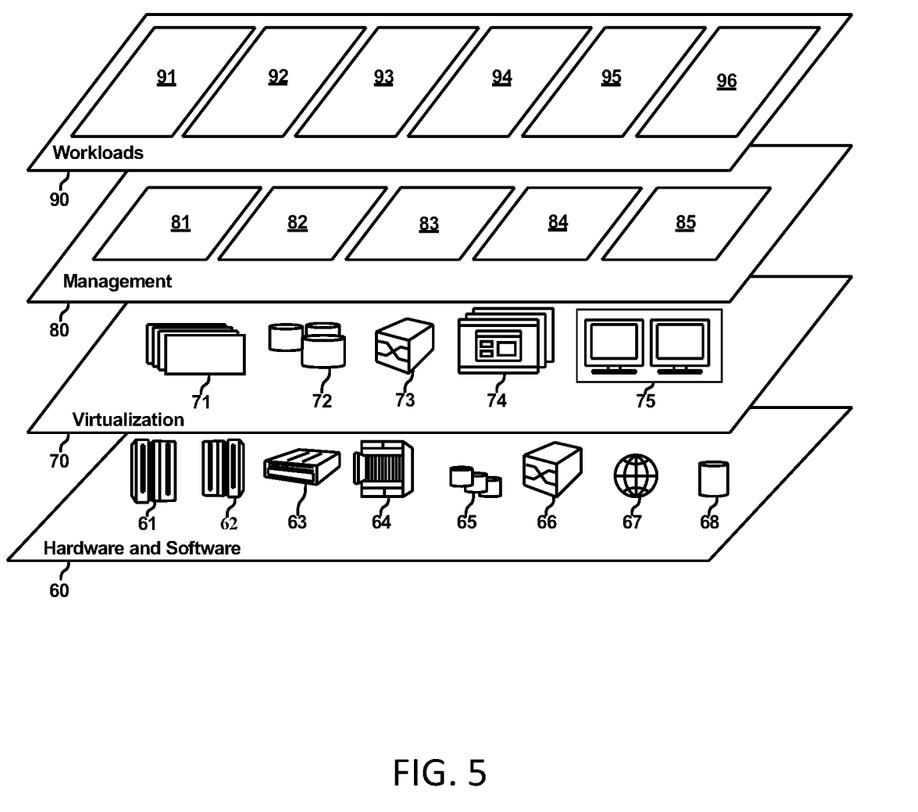
FIG. 5 illustrates abstraction model layers, in accordance with an exemplary embodiment of the present inventive concept.

The computing device 120 is described in greater detail as a hardware implementation with reference to FIG. 3, as part of a cloud implementation with reference to FIG. 4, and/or as utilizing functional abstraction layers for processing with reference to FIG. 5.

The speech recognition using cadence client 122 may act as a client in a client-server relationship with a server, for example the speech recognition using cadence server 130. The speech recognition using cadence client 122 may be a software and/or a hardware application capable of communicating with and providing a user interface for a user to interact with the speech recognition using cadence server 130 and/or other computing devices via the network 108. Moreover, the speech recognition using cadence client 122 may be capable of transferring data between the computing device 120 and other computer devices/servers via the network 108. The speech recognition using cadence client 122 may utilize various wired and wireless connection protocols for data transmission and exchange, including Bluetooth, 2.4 GHz and 5 GHz internet, near-field communication, etc. The speech recognition using cadence client 122 is described in greater detail with respect to FIGS. 2-5.

The speech recognition using cadence server 130 may include a speech recognition using cadence repository 132 for storing various data (e.g., user credentials, user speech audio, user speech corpora, speech recognition using cadence models, modified user speech corpora, context keyword database, context keyword knowledge graphs, etc.) and speech recognition using cadence program 134. The speech recognition using cadence program 134 may identify speech cadence in transcribed user speech; identify at least one speech cadence pattern; identify a speech context corresponding to the speech cadence pattern; and modify transcribed user speech based on the speech context. The speech recognition using cadence server 130 may act as a server in a client-server relationship with a client (e.g., the speech recognition using cadence client 122). The speech recognition using cadence server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. Although the speech recognition using cadence server 130 is shown as a single computing device, the present inventive concept is not limited thereto. For example, the speech recognition using cadence server 130 may be comprised of a cluster or plurality of computing devices, in a modular manner, etc., working together or working independently.

The speech recognition using cadence server 130 is described in greater detail as a hardware implementation with reference to FIG. 3, as part of a cloud implementation with reference to FIG. 4, and/or as utilizing functional abstraction layers for processing with reference to FIG. 5. The speech recognition using cadence program 134 and/or the speech recognition using cadence client 122 may be software and/or hardware programs that may facilitate speech recognition using cadence discussed in further detail with reference to FIGS. 2-5.

Figure 2:
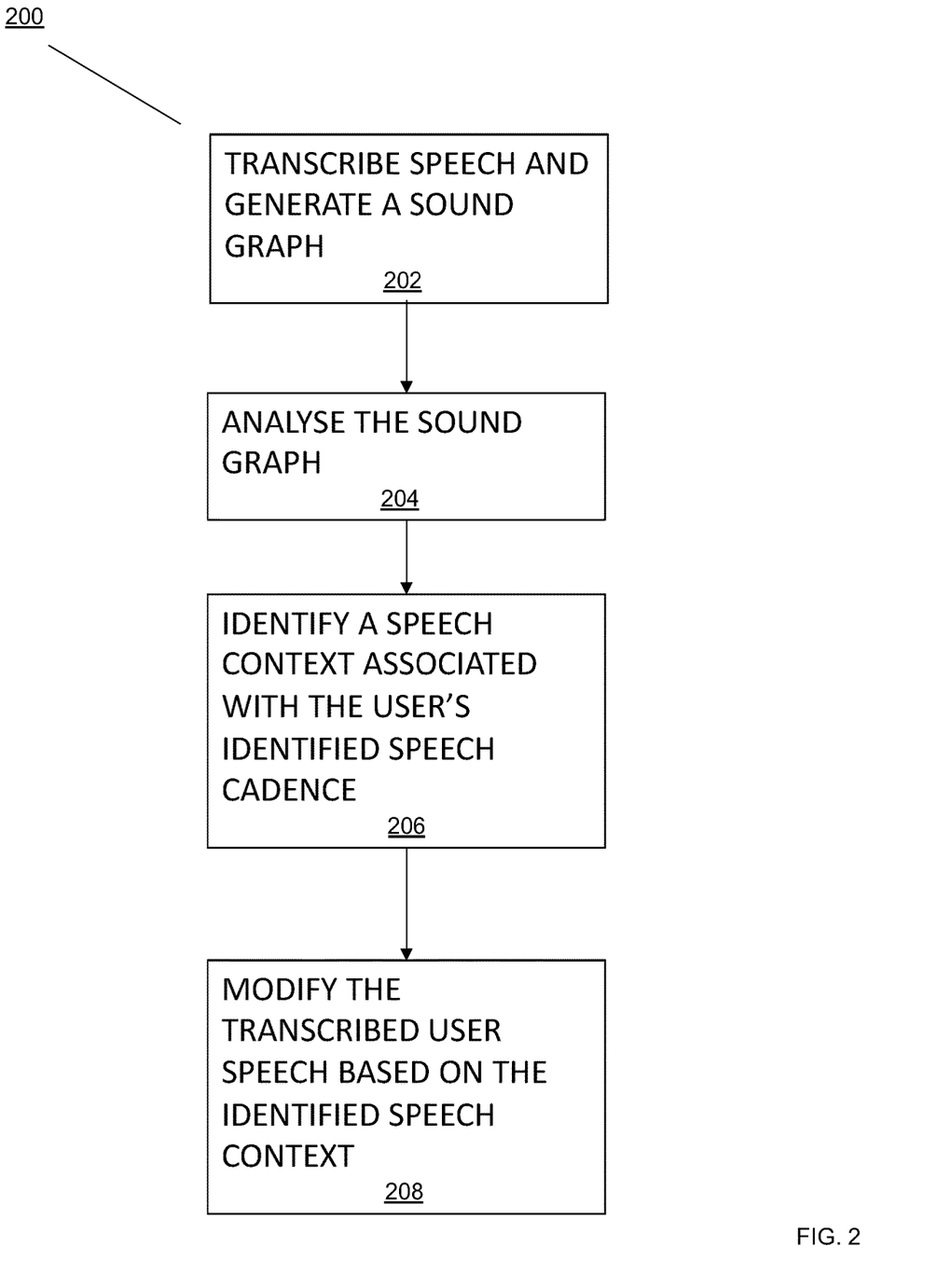
FIG. 2 illustrates a flowchart of speech recognition using cadence patterns 200, in accordance with an exemplary embodiment of the present inventive concept.

FIG. 2 illustrates the flowchart of speech recognition using cadence 200, in accordance with an exemplary embodiment of the present inventive concept.

The speech recognition using cadence program 134 may transcribe speech and generate a sound graph (step 202). The audible speech may be pre-recorded (e.g., downloaded via the network 108 or uploaded by the user) or obtained in real-time. The speech recognition using cadence program 134 may detect inflection and/or different dialects/accents. Dialects may be detected based on speech cadence and/or using a global positioning system (GPS). The speech recognition using cadence program 134 may be configured to initialize on the computing device 120 via the speech recognition using cadence client 122 upon the occurrence of a triggering event (e.g., initialization of speech recognition software) and obtain audible speech in real-time. The audible speech may be converted into transcribed speech and a sound graph. The speech recognition using cadence program 134 may correspond the transcribed speech (e.g., words, letters, sentences, etc.) with the sound graph (sounds and pauses). The audible speech may be transcribed by voice recognition software included in the speech recognition using cadence program 134 and/or the third-party speech recognition software 121. The sound graph may be generated by sound analysis software included in the speech recognition using cadence program 134 and/or the third-party speech recognition software 121. The sound graph may include characteristics of the audible speech (e.g., tone, dialect, accent, inflection, sounds, pauses, frequency, amplitude, etc.). The sound graph may also be presented in visual format for the user. The audible speech, transcribed speech, and the sound graph may be stored in the speech recognition using cadence repository 132. In an embodiment of the present invention, voice signature detection may be used to catalogue the audible speech, transcribed speech, and sounds graphs associated with a same user. A speech recognition using cadence model may be trained to transcribe speech and generate the sound graph.

Figure 2A:
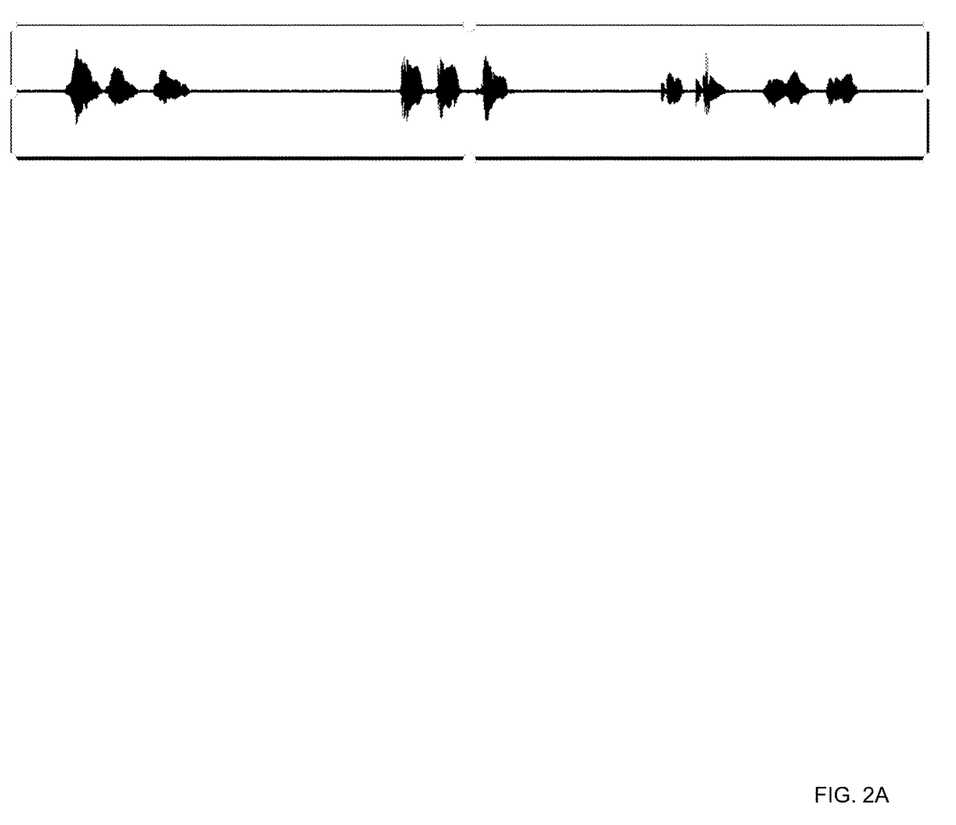
FIG. 2A illustrates a sound graph generated of a spoken telephone number, in accordance with an exemplary embodiment of the present inventive concept.

For example, a cell-phone user gives a voice command to dial a customer service number comprised of the digits 9195552200, which initializes speech recognition software. The speech recognition using cadence program 134 initializes at a substantially simultaneous time as the speech recognition software. The speech recognition using cadence program 134 transcribes the 10 digits and generates a sound graph shown with reference to FIG. 2A. The transcribed speech incorrectly reads "Dill 9195552200".

The speech recognition using cadence program 134 may analyse the sound graph (step 204). The speech recognition using cadence program 134 may identify user speech cadence from the sound graph. The user speech cadence as described herein may refer to a rhythm of speech that includes sounds and pauses therebetween. Each sound graph may represent at least a portion of an interaction with voice recognition software. The speech recognition using cadence program 134 may detect pauses and sounds in the sound graph. The sounds between pauses may be represented as tokens. The speech recognition using cadence program may identify clusters of sounds in the sound graph and the quantity of constituent sounds in each cluster, as well as the quantity of pauses between adjacent clusters. Each sound may correspond to an enunciated syllable or word of sufficient length and/or amplitude to eliminate confounding ambient and otherwise unintended noise. Discrete clusters of sounds may be identified based on a predetermined pause length or greater. The sounds may be grouped into a common cluster based on a predetermined pause length or less between sounds. The speech recognition using cadence program 134 may demarcate the sounds, clusters, pauses, and/or characteristics thereof.

The sounds and pauses (e.g., brackets, distinct colours for each sound and/or sound cluster, vertical lines, etc.) and/or annotate attributes thereof (e.g., corresponding transcribed text, quantity of sounds in a cluster, amplitudes, frequencies, etc.) may be visually depicted on the sound graph. In an embodiment, a speech cadence signature may be created for each user, which can be used to generate a speech recognition using cadence profile for personalization and/or user identification. The user's personalized speech recognition using cadence profile may take into account the characteristics of words as they are spoken by the user specifically (e.g., word length, volume, frequency, etc.) and/or common co-occurrences of neighbouring words. The generated sounds graphs, analysed and/or annotated versions of the sound graphs, and/or speech cadence signatures may be stored in the speech recognition using cadence repository 132. The speech recognition using cadence model may be trained to analyse the sound graph.

Figure 2B:
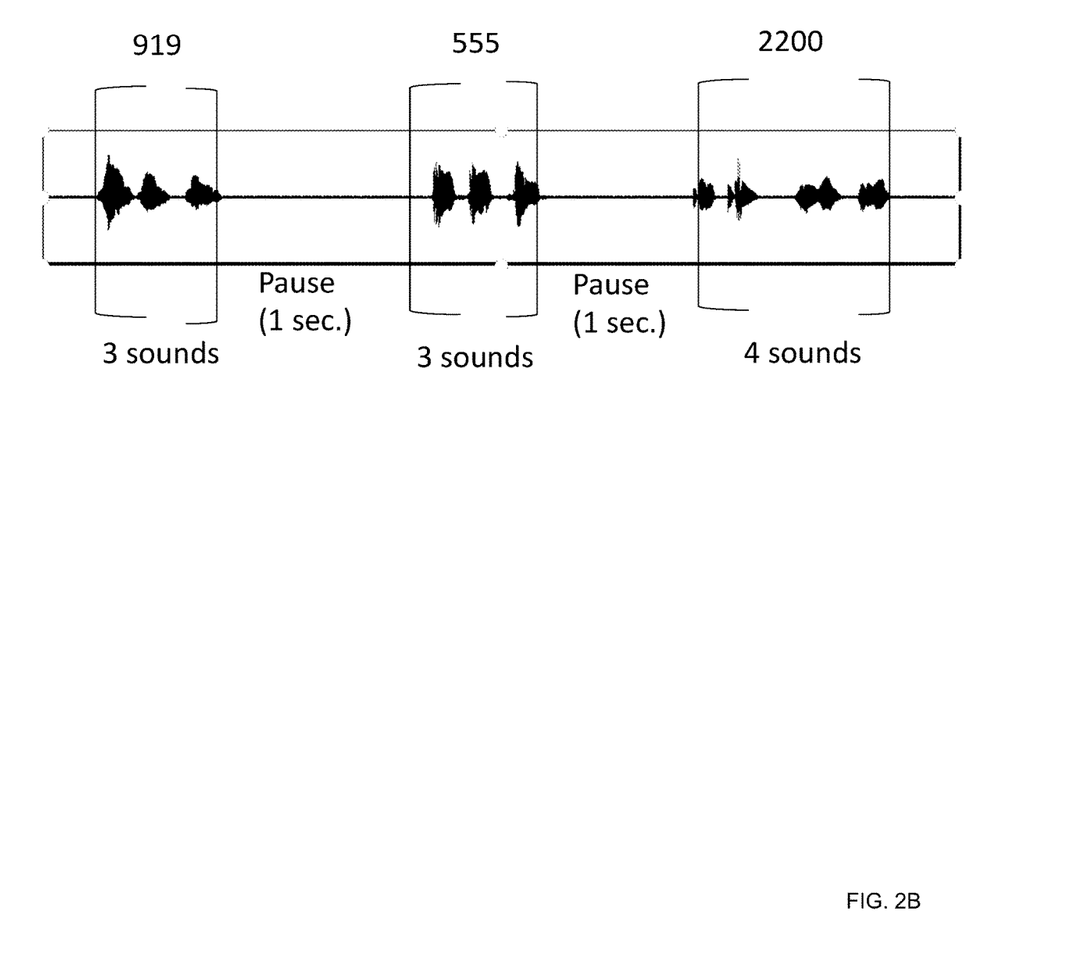
FIG. 2B illustrates an analysed sound graph with identified speech cadence for the spoken telephone number, in accordance with an exemplary embodiment of the present inventive concept.

For example, FIG. 2B illustrates a visual representation of the analysed sound graph with identified speech cadence for the cell-phone user that gave the voice command to dial the customer service number comprised of the digits 9195552200. The identified speech cadence in the analysed sound graph demonstrates a pattern of 3 sounds, pause, 3 sounds, pause, 4 sounds, pause.

The speech recognition using cadence program 134 may identify a speech context associated with the user's identified speech cadence (step 206). The user may identify the associated speech context(s) by manual input to the speech recognition using cadence program 134. Alternatively, the speech recognition using cadence program 134 may automatically identify the associated speech context based on analysis or retrieval of the identified speech cadence. The identified speech cadence may be compared to users generally, and/or based on the user's personalized speech recognition using cadence profile. The speech recognition using cadence program 134 may retrieve a match to the identified speech cadence pattern and/or voice signature in the speech recognition using cadence repository 132. The speech recognition using cadence repository 132 may contain a plurality of previously identified speech cadence patterns, each corresponding to at least one user and/or at least one speech context (e.g., industry-domain, use case, intent, acronyms, phonetic symbolic patterns, numeric symbolic patterns, topic(s) of discussion, etc.). Numeric symbolic patterns may include digit lengths associated with phone numbers, social security numbers, credit card numbers, part numbers, serial numbers, checking account numbers, etc. Phonetic symbolic patterns may include using a word to enhance the transcription of a letter. A single sound graph may contain a plurality of different contexts and/or correspond to a plurality of different users identified speech cadences. If a match to the identified speech cadence pattern is not found in the speech recognition using cadence repository 132 within a predefined threshold, the speech recognition using cadence program 134 may splice together matching sound portions (e.g., different sound graphs and/or non-consecutive sounds) and/or analyse the audible speech and/or transcribed speech using machine learning processes (e.g., automatic speech recognition (ASR) and natural language processing (NLP), respectively) to identify keywords associated with the speech context. In an embodiment, the speech recognition using cadence program 134 may also generate/use a knowledge graph for each speech context, which may include a plurality of domain related keywords. The context keywords, identified contexts, spliced matching sound portions, and/or analysed audible speech and/or transcribed speech may be stored in the speech recognition using cadence repository 132. The speech recognition using cadence model may be trained to identify speech context associated with the user's identified speech cadence and/or their personalized speech recognition using cadence profile. Thus, the speech recognition using cadence program 134 may facilitate greater accuracy of speech transcription at step 202.

For example, the speech recognition using cadence program 134 may identify the speech context associated with the identified speech cadence for the analysed sound graph of the cell-phone user that gave the voice command to dial the customer service number comprised of the digits 9195552200. The match to the identified speech cadence possesses a phonetic symbolic pattern associated with the context of reciting a telephone number. The speech recognition using cadence program 134 recognizes that the word "dial" was mistakenly transcribed/detected as "dill", and that the user was trying to make a phone call via voice command.

The speech recognition using cadence program 134 may modify the transcribed user speech based on the identified speech context (step 208). The speech recognition using cadence program 134 may compare differences between the transcribed speech and the transcribed speech corresponding to the match to the identified cadence pattern and make corrections accordingly. The speech recognition using cadence program 134 may resolve any word detection/estimation error(s) by performing the user's intended action (e.g., a voice command), generating a modified transcript, and/or communicating with the third-party speech recognition software 121 (e.g., transmitting the modified transcript, transmitting an artificial voice of the modified transcript with ideal enunciation, etc.). The modified transcript may include corrections to punctuation, hyphenation, spelling, neighbouring words (e.g., using the knowledge graph), etc. The corrections included in the modified transcript may be based on the identified speech context. The user may also provide feedback by approving, rejecting, and/or adding corrections to the modified transcript via an interface of the speech recognition using cadence client 122. The modified transcripts may be stored in the speech recognition using cadence repository 132. The modified transcript and/or the user feedback may be used to train the speech recognition using cadence model (e.g., improve audible speech detection, initial speech transcription, modified speech transcription, etc.). In an embodiment, acoustic models can be bootstrapped according to identified patterns and/or contexts (library of predefined patterns and/or contexts). In another embodiment, the user's personalized speech recognition using cadence profile may be communicated to an external computing device 120 running a speech recognition using cadence client 122 (e.g., an automated telephone line and/or user) to facilitate more accurate initial transcription or perform transcript modification upon a misdetection in conveyed speech.

Figure 2C:
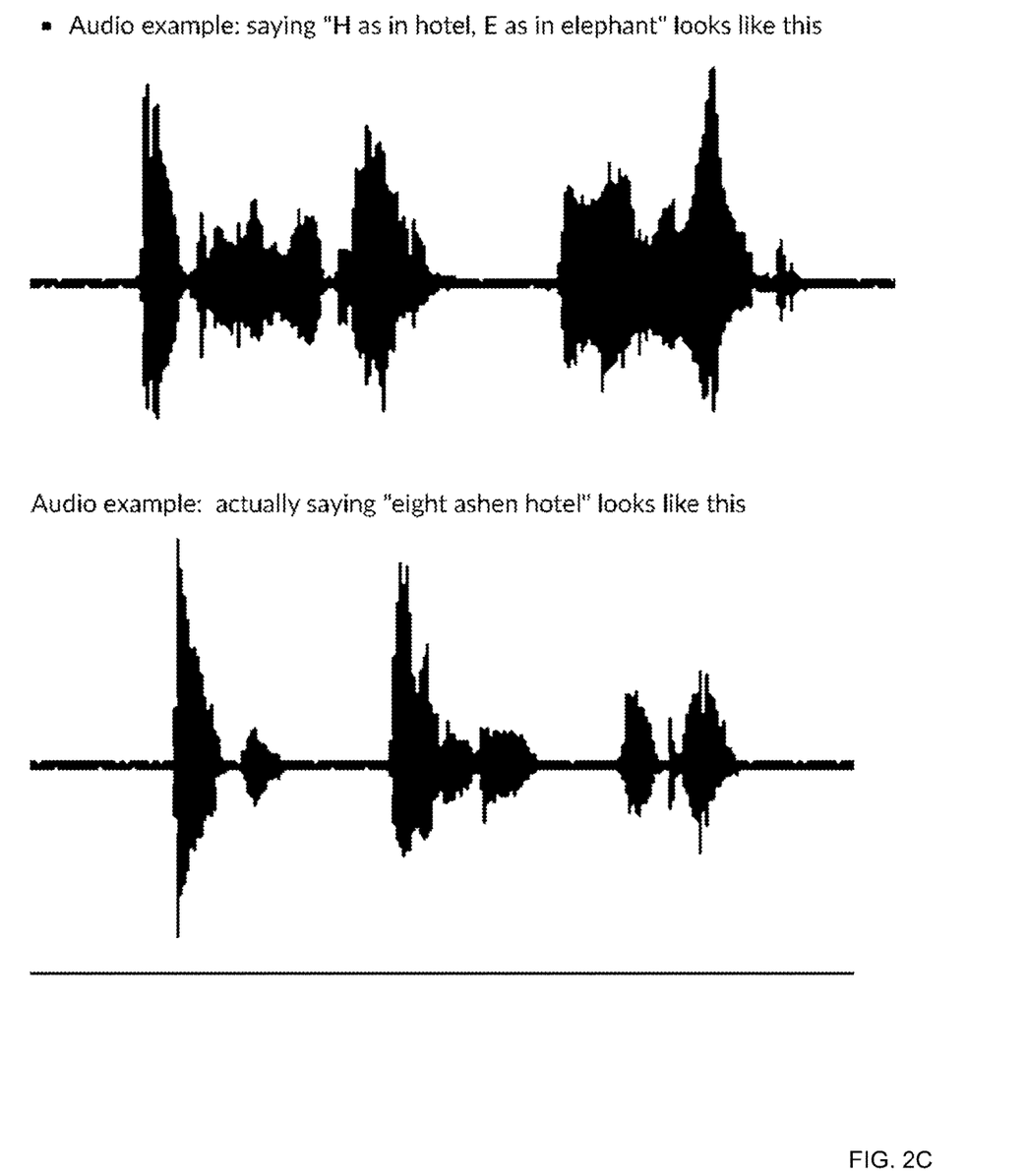
FIG. 2C depicts a sound graph associated with the modified transcript of a phonetic symbolically spelled name "Herman" versus the sound graph that would correspond to the mistakenly detected transcribed speech, "eight ashen hotel", in accordance with an exemplary embodiment of the present inventive concept.

For example, the identified context in the user speech is issuing a voice command to make a call. Thus, the neighbouring word "Dill" is replaced by "Dial" and the numbers 9195552200 have parentheses and hyphens inserted as follows: (919)-555-2200. Furthermore, the speech recognition using cadence program 134 takes the initiative to make the call on the user's cell-phone. The call is connected to an automated speech recognition enabled customer service operator running the speech recognition using cadence program 134. The user asks to speak to the live representative "Herman" and spells out the name "H as in hotel, E as in elephant, R as in robot, M as in Michael, A as in Apple, N as in Nancy." The speech recognition using cadence client 122 of the automated speech recognition enabled operator performs steps 202-208 and successfully detects the utterance of the name Herman given the identified context of phonetic symbolics. FIG. 2C depicts a sound graph associated with the modified transcript of the phonetic symbolically spelled name Herman versus the mistakenly detected transcribed speech, "eight ashen hotel".

FIG. 3 illustrates a block diagram depicting the hardware components of the speech recognition using cadence system 100 of FIG. 1, in accordance with an exemplary embodiment of the present inventive concept.

It should be appreciated that FIG. 3 provides only an illustration of one implementation and does not imply any limitations regarding the environments in which different embodiments may be implemented. Many modifications to the depicted environment may be made.

Devices used herein may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311 are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 314 to read from and write to one or more portable computer readable storage media 326. Application programs 311 on said devices may be stored on one or more of the portable computer readable storage media 326, read via the respective R/W drive or interface 314 and loaded into the respective computer readable storage media 308.

Devices used herein may also include a network adapter or interface 316, such as a TCP/IP adapter card or wireless communication adapter (such as a 4G wireless communication adapter using OFDMA technology). Application programs 311 on said computing devices may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Devices used herein may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

It is to be understood that although this disclosure includes a detailed description on cloud computing, implementation of the teachings recited herein are not limited to a cloud computing environment. Rather, the exemplary embodiments of the present inventive concept are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 illustrates a cloud computing environment, in accordance with an exemplary embodiment of the present inventive concept.

As shown, cloud computing environment 50 may include one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

FIG. 5 illustrates abstraction model layers, in accordance with an exemplary embodiment of the present inventive concept.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech recognition using cadence 96.

The exemplary embodiments of the present inventive concept may be a system, a method, and/or a computer program product at any possible technical detail level of integration. The computer program product may include a computer readable storage medium (or media) having computer readable program instructions thereon for causing a processor to carry out aspects of the present inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive concept.

Aspects of the present inventive concept are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method comprising:
receiving, by one or more processors, user speech from a computing device over a network;
in real time:
transcribing, by one or more processors, the received user speech to generate a transcript;
generating, by one or more processors, a sound graph of the received user speech, wherein the sound graph includes annotations, the annotations including a number identifying a total quantity of sounds in a sound cluster;
storing, by one or more processors, the received user speech, the transcript of the received user speech, and the sound graph to a repository;
presenting, by one or more processors, the sound graph on a graphical user interface;
identifying, by one or more processors, speech cadence in the user speech from the sound graph by retrieving a match to the identified speech cadence from the repository, wherein the speech cadence includes sounds and pauses;
identifying, by one or more processors, a speech cadence pattern from the sounds and pauses, wherein identifying the speech cadence pattern comprises detecting, by one or more processors, a dialect based on the speech cadence and global positioning system (GPS) data; and
generating, by one or more processors, a modified transcript of the received user speech based on the speech cadence pattern;
sending, by one or more processors, the modified transcript over the network to the computing device;
receiving, by one or more processors, user feedback, from the computing device over the network, on the modified transcript; and
training, by one or more processors, a model using the user feedback and the modified transcript, wherein the model is personalized for the user.

2. The computer-implemented method of claim 1, wherein the speech cadence pattern includes at least one cluster of the sounds and pauses.

3. The computer-implemented method of claim 1, wherein the speech cadence pattern corresponds to a speech context.

4. The computer-implemented method of claim 3, wherein the transcript of the received user speech is modified based on the speech context.

5. The computer-implemented method of claim 4, wherein modifications to the transcript of the received user speech include replacing a first word with a second word.

6. The computer-implemented method of claim 1, further comprising:
comparing, by one or more processors, the speech cadence pattern with a second speech cadence pattern stored in the repository.

7. The computer-implemented method of claim 6, wherein the match is to the second speech cadence pattern and corresponds to a speech context.

8. The computer-implemented method of claim 1, wherein the user speech is received in real-time.

9. The computer-implemented method of claim 1, wherein:
identifying the speech cadence pattern comprises identifying a phonetic symbolic pattern associated with a context of reciting a telephone number; and
modifying the transcript comprises inserting hyphens and parenthesis into a string of numbers identified to be a phone number.

10. The computer-implemented method of claim 1, wherein:
the received user speech comprises a first word followed by spelling out the first word using a phonetic alphabet; and
identifying the speech cadence pattern further comprises detecting the first word using context of phonetic symbolics of the phonetic alphabet.

11. The computer-implemented method of claim 1, wherein the annotations comprise:

characteristics of audible speech selected from the group consisting of tone, dialect, accent, inflection, and pauses; and annotated attributes selected from the group consisting of corresponding transcribed text, brackets for each sound cluster, and a distinct color for each sound cluster.

12. A computer program product comprising:

one or more computer-readable storage media; and program instructions stored on the one or more computer-readable storage media to perform operations comprising:

receiving user speech from a computing device over a network;

in real time:
transcribing the received user speech to generate a transcript;
generating a sound graph of the received user speech, wherein the sound graph includes annotations, the annotations including a number identifying a total quantity of sounds in a sound cluster;
storing the received user speech, the transcript of the received user speech, and the sound graph to a repository:
presenting the sound graph on a graphical user interface;
identifying speech cadence in the user speech from the sound graph by retrieving a match to the identified speech cadence from the repository, wherein the speech cadence includes sounds and pauses;
identifying a speech cadence pattern from the sounds and pauses, wherein identifying the speech cadence pattern comprises detecting a dialect based on the speech cadence and global positioning system (GPS) data; and
generating a modified transcript of the received user speech based on the speech cadence pattern;
sending the modified transcript over the network to the computing device;
receiving user feedback, from the computing device over the network, on the modified transcript; and
training a model using the user feedback and the modified transcript, wherein the model is personalized for the user.

13. The computer program product of claim 12, wherein the speech cadence pattern includes at least one cluster of the sounds and pauses.

14. The computer program product of claim 12, wherein the speech cadence pattern corresponds to a speech context.

15. The computer program product of claim 14, wherein the transcript of the received user speech is modified based on the speech context.

16. The computer program product of claim 15, wherein modifications to the transcript of the received user speech include replacing a first word with a second word.

17. The computer program product of claim 12, wherein the operations further comprise:
comparing the speech cadence pattern with a second speech cadence pattern stored in the repository.

18. The computer program product of claim 17, wherein the match is to the second speech cadence pattern and corresponds to a speech context.

19. A computer system comprising:

a processor set;

one or more computer-readable storage media; and program instructions stored on the one or more computer-readable storage media to cause the processor set to perform operations comprising:

receiving user speech from a computing device over a network;

in real time:
transcribing the received user speech to generate a transcript;
generating a sound graph of the received user speech, wherein the sound graph includes annotations, the annotations including a number identifying a total quantity of sounds in a sound cluster;
storing the received user speech, the transcript of the received user speech, and the sound graph to a repository:
presenting the sound graph on a graphical user interface;
identifying speech cadence in the user speech from the sound graph by retrieving a match to the identified speech cadence from the repository, wherein the speech cadence includes sounds and pauses;
identifying a speech cadence pattern from the sounds and pauses, wherein identifying the speech cadence pattern comprises detecting a dialect based on the speech cadence and global positioning system (GPS) data; and
generating a modified transcript of the received user speech based on the speech cadence pattern;
sending the modified transcript over the network to the computing device;
receiving user feedback, from the computing device over the network, on the modified transcript; and
training a model using the user feedback and the modified transcript, wherein the model is personalized for the user.

* * * * *